(12) United States Patent
Sohn et al.

(10) Patent No.: US 9,074,042 B2
(45) Date of Patent: *Jul. 7, 2015

(54) PACKAGING FILM INCLUDING A LACTIDE COPOLYMER

(71) Applicant: LG CHEM LTD., Seoul (KR)

(72) Inventors: Jung-Min Sohn, Daejeon (KR); Seung Young Park, Daejeon (KR); Sung-Cheol Yoon, Daejeon (KR); Do-Yong Shim, Bucheon-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,288

(22) Filed: Dec. 4, 2013

(65) Prior Publication Data

US 2014/0154489 A1 Jun. 5, 2014

Related U.S. Application Data

(63) Continuation of application No. PCT/KR2012/004483, filed on Jun. 7, 2012.

(30) Foreign Application Priority Data

| Jun. 7, 2011 | (KR) | 10-2011-0054751 |
| Jun. 7, 2012 | (KR) | 10-2012-0060882 |

(51) Int. Cl.
| C08G 18/42 | (2006.01) |
| C08G 63/08 | (2006.01) |
| C08G 18/48 | (2006.01) |
| C08G 18/72 | (2006.01) |
| C08J 5/18 | (2006.01) |
| C08G 18/79 | (2006.01) |
| C09J 175/04 | (2006.01) |
| C08G 63/66 | (2006.01) |
| C08G 18/73 | (2006.01) |
| C08G 18/76 | (2006.01) |

(52) U.S. Cl.
CPC .......... *C08G 63/08* (2013.01); *C08G 18/4887* (2013.01); *C08G 18/725* (2013.01); *C08J 5/18* (2013.01); *C08G 18/792* (2013.01); *C09J 175/04* (2013.01); *C08J 2367/04* (2013.01); *C08J 2375/06* (2013.01); *C08G 63/66* (2013.01); *C08G 18/42* (2013.01); *C08G 18/73* (2013.01); *C08G 18/7671* (2013.01)

(58) Field of Classification Search
CPC .......... C08G 18/4009; C08G 18/4072; C08G 18/4244; C08G 18/4887; C08G 18/725; C08G 18/792; C08G 18/4266; C08G 18/428; C08G 3/08; C08G 3/664; C08G 3/823; C08G 3/912; C08G 3/4887; C08G 3/6852; C08L 75/06; C08L 75/08
USPC .......... 525/408, 415, 450, 454, 460
See application file for complete search history.

(56) References Cited

U.S. PATENT DOCUMENTS

| 4,368,278 A * | 1/1983 | Rasshofer et al. ............ 521/115 |
| 6,087,465 A * | 7/2000 | Seppala et al. ................ 528/80 |
| 6,211,249 B1 * | 4/2001 | Cohn et al. ................ 514/772.1 |

FOREIGN PATENT DOCUMENTS

| EP | 0295055 A2 | 12/1988 |
| JP | 07-268057 A | 10/1995 |
| JP | 08-027256 A | 1/1996 |
| JP | 09-143239 A | 6/1997 |
| JP | H1135655 A | 2/1999 |
| JP | 11-255874 A | 9/1999 |
| JP | 2000230029 A | 8/2000 |
| JP | 2009203296 A | 9/2009 |
| KR | 10-2010-0121120 A | 11/2010 |

OTHER PUBLICATIONS

Zhang, C., et al.; Macromolecular Rapid Communications, 2007, p. 422-427.*
Yam, K.L.; The Wiley Encyclopedia of Packaging Technology, 2009, p. 436-439.*
Kim, Hye Young and Kim, Sung Chul,: "Synthesis and Properties of Poly(L-lactide)-Polyether-Poly(L-lactide) Triblock Copolyers", Macromolecular Research, vol. 19, No. 5, pp. 448-452 May 31, 2011, 448-449.

* cited by examiner

*Primary Examiner* — Robert Jones, Jr.
(74) *Attorney, Agent, or Firm* — McKenna Long & Aldridge LLP

(57) ABSTRACT

The present invention relates to a packaging film including a lactide copolymer having no problem of pollution or toxicity while having good flexibility in addition to excellent properties such as mechanical properties, transparency, and processability, and preferably being applicable to food packaging. The packaging film includes a lactide copolymer including two or more specific block copolymerized repeating units that the hard segments of polylactide repeating units are connected to both ends of the soft segments of polyether polyol repeating unit, wherein the block copolymerized repeating units are connected to each other through the intermediation of urethane connecting groups derived from polyvalent isocyanate compound of which the average equivalent of isocyanate group per a molecule is more than 2 and less than 3.

12 Claims, 1 Drawing Sheet

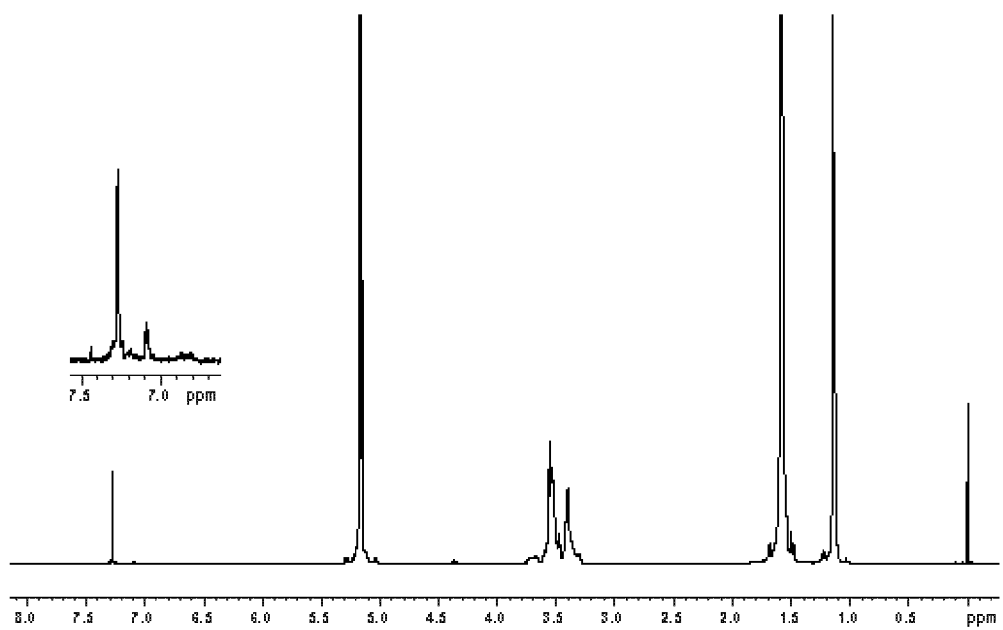

PACKAGING FILM INCLUDING A LACTIDE COPOLYMER

This application is a Continuation Bypass Application of International Patent Application No. PCT/KR2012/004483, filed Jun. 7, 2012, and claims the benefit of Korean Application No. 10-2011-0054751, filed on Jun. 7, 2011 and Korean Application No. 10-2012-0060882, filed on Jun. 7, 2012, all of which are hereby incorporated herein by reference in their entirety for all purposes as if fully set forth herein.

TECHNICAL FIELD

The present invention relates to a packaging film including a lactide copolymer. More specifically, the present invention relates to a packaging film including a lactide copolymer having good flexibility in addition to excellent properties such as mechanical properties and processability and preferably being applicable as a packaging material.

BACKGROUND OF THE INVENTION

Polylactide (or polylactic acid) is a kind of resin including the repeating unit represented by the following general formula. Such polylactide resin is a material having proper mechanical strength coming close to prior petroleum-based resins in company with eco-friendly characteristics such as recyclability as a reproductive resource, less $CO_2$ (a greenhouse gas) generation during the production than prior resins, and biodegradability by moisture and microorganism in landfill, because it is based on a biomass unlike prior petroleum-based resins:

[General Formula]

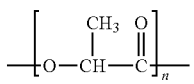

As the preparation method of the polylactide resin, the method of carrying out a direct polycondensation of lactic acid or a ring opening polymerization of lactide monomer in the presence of organic metal catalyst has been known. Among them, the direct polycondensation method is very difficult to eliminate moisture which is a by-product effectively because the viscosity increases rapidly in the process of the polycondensation. Hence, it is difficult to obtain the polymer having high weight average molecular weight of 100,000 or more, and thus it is difficult to secure sufficient physical and mechanical properties of the polylactide resin. Meanwhile, the ring opening polymerization method of lactide monomer is more complicated in the preparation process and requires higher cost than the polycondensation because the lactide monomer is prepared from a lactic acid in advance, but it has been commercially used because the resin having relatively high molecular weight can be relatively easily obtained through the lactide ring opening polymerization using an organic metal catalyst and the control of polymerization rate is favorable.

Such polylactide has been mainly used for disposable packaging/container, coating, forming, film/sheet, and fiber, and recently, it is actively being attempted to use the polylactide resin for semipermanent uses such as a mobile phone case or a vehicle interior, after mixing the same with prior resins such as acrylonitrile-butadiene-styrene (ABS), polycarbonate, polypropylene, and the like so as to reinforce the properties. However, the polylactide resin has a weakness in its own properties, being hydrolyzed by the catalyst used in the preparation or moisture in the air.

Particularly, when the polylactide resin or a copolymer including the same is processed into a film and used as a disposable packaging material, the weakness in the properties such as weak impact resistance and bad flexibility is a great setback for various market extensions.

SUMMARY OF THE INVENTION

The present invention provides a packaging film including a lactide copolymer having no problem of pollution or toxicity while having good flexibility in addition to excellent properties such as mechanical properties, transparency, and processability, and preferably being applicable to food packaging and the like.

The present invention provides a packaging film including a lactide copolymer including two or more block copolymerized repeating units of Chemical Formula 1 in which the hard segments of polylactide repeating units are linked to both ends of the soft segments of polyether polyol repeating unit, wherein the block copolymerized repeating units are connected to each other through the intermediation of urethane connecting groups derived from a polyvalent isocyanate compound of which the average equivalent of isocyanate group per a molecule is more than 2 and less than 3:

[Chemical Formula 1]

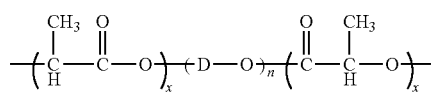

in Chemical Formula 1, D is a $C_2$-$C_{10}$ linear or branched alkylene group, x is independently an integer of 30 to 500, and n is an integer of 30 to 1,000.

DETAILED DESCRIPTION OF THE EMBODIMENT

Hereinafter, the packaging film according to a specific embodiment of the invention is explained in more detail.

According to one embodiment of the invention, a packaging film including a lactide copolymer including two or more block copolymerized repeating units of Chemical Formula 1 in which the hard segments of polylactide repeating units are linked to both ends of the soft segments of polyether polyol repeating unit, wherein the block copolymerized repeating units are connected to each other through the intermediation of urethane connecting groups derived from a polyvalent isocyanate compound of which the average equivalent of isocyanate group per a molecule is more than 2 and less than 3, is provided:

[Chemical Formula 1]

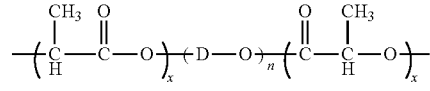

in Chemical Formula 1, D is a $C_2$-$C_{10}$ linear or branched alkylene group, x is independently an integer of 30 to 500, and n is an integer of 30 to 1,000.

The packaging film includes a lactide copolymer satisfying a certain structural characteristic.

Such lactide copolymer includes the block copolymerized repeating unit of Chemical Formula 1 in which the hard segments of polylactide repeating units are linked to both ends of the soft segments of polyether polyol repeating unit derived from polyalkylene glycol.

And, such block copolymerized repeating units are included plurally, 2 or more, in the copolymer, and these copolymer repeating units are connected to each other through the intermediation of urethane connecting group. More specifically, the urethane connecting group is derived from a polyvalent isocyanate compound of which the average equivalent of isocyanate group per a molecule is more than 2 and less than 3, and may include the urethane bonds formed by the reaction of terminal hydroxyl groups derived from the polylactide repeating unit and the isocyanate groups derived from the polyvalent isocyanate compound more than 2 and less than 3 per one urethane connecting group on the average.

At this time, for example, that the average equivalent of isocyanate group per a molecule is more than 2 and less than 3 may mean that the diisocyanate compound of which the equivalent of isocyanate group is 2 and the polyvalent isocyanate compound of which the equivalent of isocyanate group is 3 or more are included together in the polyvalent isocyanate compound having the equivalent more than 2 and less than 3 in the form of mixture, and the average number (i.e., equivalent) of the isocyanate groups per a molecule included in the total polyvalent isocyanate compound mixture is more than 2 and less than 3. According to such origination of the polyvalent isocyanate compound, said urethane connecting group may include the linear connecting group including 2 urethane bonds per a molecule and the branched connecting group including 3 or more urethane bonds per a molecule together.

Therefore, the plurality of block copolymerized repeating units included in the lactide copolymer may be connected to each other through the intermediation of the linear urethane connecting group partially, and the remains may be connected to each other by the branched urethane connecting group.

According to the structure of such block copolymerized repeating unit and the connecting structure of these repeating units, the lactide copolymer includes a certain soft segment and can show superior flexibility to prior known polylactide resins or lactide copolymers. And, since such soft segment for improving flexibility is linked in the lactide copolymer by said connecting structures, there is less concern about the emission of the soft segment during processing or using. Therefore, the packaging film of one embodiment including such lactide copolymer can exhibit good flexibility suitable as the material for food packaging, and there is substantially no concern about that food is contaminated by the emission of the soft segment component.

And, as supported by the below Examples, because of the structure that the block copolymerized units are connected through the intermediation of certain urethane connecting groups, namely the connecting groups derived from the polyvalent isocyanate compound of which the equivalent of isocyanate group per a molecule is more than 2 and less than 3, the lactide copolymer can have higher molecular weight even under the same polymerization condition and thus the packaging film of one embodiment can have excellent mechanical properties. Furthermore, due to such connecting structure, it may become easy to control the molecular weight of the lactide copolymer and the properties of the packaging film according to the same.

And, both of the linear urethane connecting group including 2 urethane bonds and the branched urethane connecting group including 3 or more urethane bonds are included in the lactide copolymer disclosed above, and the block copolymerized repeating units are linked through the intermediation of such urethane connecting groups. Due to such connecting structure, the lactide copolymer can include both of the linear copolymer chain and the branched copolymer chain together with a proper ratio. As the result, the lactide copolymer can show higher melt viscosity at the same molecular weight, and thus it can exhibit more excellent melt processability. Accordingly, the packaging film including such lactide copolymer can be easily prepared by melt processing.

If the urethane connecting group is derived from the polyvalent isocyanate compound of which the average equivalent of isocyanate group per a molecule is 3 or more, the block copolymerized repeating unit may have the structure mainly connected by the branched urethane connecting group. In this case, the molecular weight of the lactide copolymer may excessively increase, and effective processing may be difficult because of gelation. On the contrary, if the urethane connecting group is derived from the polyvalent isocyanate compound of which the average equivalent of isocyanate group per a molecule is 2 or less, the block copolymerized repeating unit may have the structure mainly connected by the linear urethane connecting group. In this case, the molecular weight of the lactide copolymer or the mechanical properties of the packaging film including the same may be insufficient and the processability may fall because the melt viscosity is excessively low.

Whereas, the lactide copolymer including the urethane connecting groups having the equivalent more than 2 and less than 3 and the packaging film of one embodiment including the same have substantially no problem of toxicity or pollution while having excellent properties such as mechanical properties, and can exhibit excellent flexibility enough to be used for food packaging.

Hereinafter, the packaging film is explained in more detail. At first, the lactide copolymer composing the film and the preparation method of the same are explained in more detail, and then the method of forming the film itself and the characteristics of the film are explained.

In the lactide copolymer, each block copolymerized repeating unit of Chemical Formula 1 may have the weight average molecular weight of about 50,000 to 200,000, or about 70,000 to 180,000, and the lactide copolymer in which such copolymerized repeating units are plurally connected may have the weight average molecular weight of about 100,000 to 1,000,000, or about 100,000 to 500,000. Such lactide copolymer can exhibit and maintain the excellent mechanical properties such as good strength and the like because it can have such high molecular weight, and thus the packaging film including the same can be very preferably used as various packaging materials.

And, the lactide copolymer includes a plurality of the block copolymerized repeating unit of Chemical Formula 1 including the soft segment of polyether polyol repeating unit in company with the hard segment of polylactide repeating unit. In such block copolymerized repeating unit, the soft segment of polyether polyol repeating unit may be a repeating unit derived from a polyether polyol polymer, for example a $C_2$-$C_8$ polyalkylene glycol. More specifically, the polyether polyol repeating unit may be a polyalkylene glycol repeating unit selected from the group consisting of polyethyleneglycol (PEG) repeating unit, poly(1,2-propyleneglycol) repeating unit, poly(1,3-propanediol) repeating unit, polytetramethyleneglycol repeating unit, and polybutyleneglycol repeating unit.

And, such polyether polyol repeating unit may have the number average molecular weight of about 1,000 to 15,000, about 2,000 to 13,000, or about 3,000 to 10,000. Because of including the polyether polyol repeating unit having high molecular weight of such range as the soft segment, the lactide copolymer and the packaging film including the same can exhibit and maintain more excellent flexibility, and thus can show more improved mechanical properties because the copolymer has higher molecular weight.

Furthermore, in the lactide copolymer disclosed above, each block copolymerized repeating unit may include about 50 to 95 weight % or about 60 to 90 weight % of the hard segments, and the remains of the soft segments, for example about 5 to 50 weight % or about 10 to 40 weight % of the soft segments. If the content of the hard segments is too low, the mechanical properties such as the strength of the lactide copolymer and the packaging film may fall, on the contrary, the content of the hard segments is excessively high or the content of the soft segments is too low, the flexibility of the lactide copolymer and the packaging film get worse and the packaging film is easily torn or difficult to be used. In addition, if the content of the soft segment is excessively high, the lactide copolymer may be degraded and the problem of that the mechanical properties of the packaging film fall more may arise. It seems because the soft segment acts as a kind of initiator and may promote depolymerization or degradation of the lactide copolymer, particularly the hard segment of the polylactide repeating unit.

And, the lactide copolymer includes two or more block copolymerized repeating units of Chemical Formula 1, and such block copolymerized repeating units are connected with the urethane connecting groups derived from the polyvalent isocyanate compound of which the average equivalent of isocyanate group per a molecule is more than 2 and less than 3, about 2.1 to 2.9, or about 2.2 to 2.8. More concretely, such urethane connecting group may include an urethane bond formed by the reaction of terminal hydroxyl groups derived from the polylactide repeating unit and the isocyanate groups derived from the polyvalent isocyanate compound, and more than 2 and less than 3 urethane bonds are included in a urethane connecting group on the average and the block copolymerized repeating units are connected to each other by the bonds.

For example, the polyvalent isocyanate compound for forming such urethane connecting group may include the diisocyanate compound of which the equivalent of isocyanate group is 2 and the polyvalent isocyanate compound of which the equivalent of isocyanate group is 3 or more together, for example, in a form of mixture, so as to satisfy the equivalent range of more than 2 and less than 3 disclosed above.

At this time, as the example of the diisocyanate compound, ethylene diisocyanate, 1,4-tetramethylene diisocyanate, 1,6-hexamethylene diisocyanate (HDI), 1,2-dodecane diisocyanate, cyclohexane-1,3-diisocyanate, cyclohexane-1,4-diisocyanate, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4-diphenylmethane diisocyanate, perhydro-4,4'-diphenylmethane diisocyanate, 1,3-phenylene diisocyanate, 1,4-phenylene diisocyanate, 1,4-stilbene diisocyanate, 3,3'-dimethyl-4,4'-diphenylene diisocyanate, toluene 2,4-diisocyanate (TDI), toluene 2,6-diisocyanate, diphenylmethane-2,4'-diisocyanate (MDI), diphenylmethane-2,2'-diisocyanate, diphenylmethane-4,4'-diisocyanate, or naphthalene-1,5-diisocyanate may be used, and as the example of the polyvalent isocyanate compound of which equivalent of isocyanate group is 3 or more, a compound selected from the group consisting of an oligomer of above diisocyanate compounds, a polymer of above diisocyanate compounds, a ring type multimer of above diisocyanate compounds, hexamethylene diisocyanate isocyanurate, a triisocyanate compound, and an isomer thereof may be used.

The polyvalent isocyanate compound satisfying the average equivalent range of more than 2 and less than 3 may be obtained by including the diisocyanate compound and the polyvalent isocyanate compound having the equivalent of 3 or more in a proper ratio, and the urethane connecting group for connecting the block copolymerized repeating units can be formed by using the same. As the result, as disclosed above, the lactide copolymer can show higher molecular weight and excellent mechanical properties according to this in addition to a proper melt viscosity and improved processability. The properties of the lactide copolymer are reflected in the packaging film of one embodiment, and thus the packaging film can be easily prepared and can exhibit superior mechanical properties.

Meanwhile, though it will be explained below in more detail, the lactide copolymer may be obtained by a ring opening polymerization of a lactide monomer using a specific catalyst in the presence of a macro-initiator of a polymer forming the polyether polyol repeating unit. Such specific catalyst may be a catalyst including the organic metal complex of the following Chemical Formula 2 or a mixture of the compounds of the following Chemical Formulae 3 and 4:

[Chemical Formula 2]

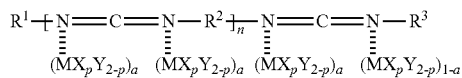

[Chemical Formula 3]

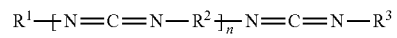

[Chemical Formula 4]

in Chemical Formulae 2 to 4, n is an integer of 0 to 15, p is an integer of 0 to 2, M is Sn or Zn, $R^1$ and $R^3$ are same to or different from each other and respectively hydrogen, a substituted or non-substituted $C_3$-$C_{10}$ alkyl, a substituted or non-substituted $C_3$-$C_{10}$ cycloalkyl, or a substituted or non-substituted $C_6$-$C_{10}$ aryl, $R^2$ is a substituted or non-substituted $C_3$-$C_{10}$ alkylene, a substituted or non-substituted $C_3$-$C_{10}$ cycloalkylene, or a substituted or non-substituted $C_6$-$C_{10}$ arylene, and X and Y are independently alkoxy or carboxyl group.

By such catalyst, it is possible to carry out the ring opening polymerization of the lactide monomer to form the hard segments, and the block copolymerized repeating units can be obtained through the process that such hard segments are copolymerized with the soft segments derived from the macro-initiator, and the lactide copolymer can be prepared by connecting such block copolymerized repeating units to each other.

By the way, such specific catalyst has very superior polymerization activity to prior known catalysts, and makes it possible to prepare the polylactide repeating unit of high molecular weight even with a small quantity. Therefore, the lactide copolymer can have high weight average molecular weight disclosed above, due to the high molecular weight of the hard segment and the soft segment and the connecting structure of the block copolymerized repeating units of Chemical Formula 1. Hence, the lactide copolymer and the packaging film including the same can exhibit excellent mechanical properties.

Moreover, owing to the excellent activity of the catalyst, the lactide copolymer can be prepared with lesser amount of the catalyst, and the amount of residual metal in the lactide copolymer, namely, the amount of residual tin or zinc came from the catalyst, may be lowered to about 20 ppm or less or about 4 to 20 ppm. As the result, there is less concern about that the residual catalyst (metal) causes depolymerization or degradation of the lactide copolymer or the packaging film and makes the mechanical properties of them worse, and there is substantially no concern over that the residual metal causes a pollution problem or toxicity.

Furthermore, in the case of using the complex catalyst of Chemical Formula 2, the content of the residual carbodiimide-based component came from such catalyst, namely, the residual content of all components but $MX_pY_{2-p}$, may be about less than 0.2 weight % or about less than 0.15 weight % per the total copolymer, and the content of the residual carbodiimide-based component of Chemical Formula 3 may be about less than 0.2 weight % or about less than 0.15 weight % even in the case of using the mixture catalyst of Chemical Formulae 3 and 4.

And, the lactide copolymer may include the residual lactide monomer of about 1.0 weight % or less, for example about 0.8 weight % or less, based on the weight of the same.

Like this, since the lactide copolymer has high molecular weight and excellent mechanical properties while having low content of the residual catalyst (metal and the like) or the residual lactide monomer, degradation or depolymerization during processing or using can be suppressed and it becomes possible to exhibit and maintain excellent mechanical properties like strength. And, the problem of pollution or toxicity due to the residual catalyst or monomer can be minimized. As the result, the packaging film including the lactide copolymer can be used as various packaging materials such as packaging materials for food very preferably, owing to the minimized risk of pollution or toxicity.

And, the lactide copolymer may include the residual metal of tin or zinc came from the catalyst in a form of the catalyst itself, namely, in a form of residual catalyst including the organic metal complex of the following Chemical Formula 2 or the mixture of the compounds of the following Chemical Formulae 3 and 4. At this time, $MX_pY_{2-p}$ linked in Chemical Formula 2 or $MX_pY_{2-p}$ of Chemical Formula 4 may be tin(II) 2-ethylhexanoate($Sn(Oct)_2$).

Since the lactide copolymer disclosed above includes two or more block copolymerized repeating units including hard segment-soft segment-hard segment consisting of polylactide repeating unit-polyether polyol repeating unit-polylactide repeating unit, it can show biodegradability unique to the resin based on a biomass. Furthermore, it is very easy to control the molecular weight of the resin because it has the structure that the block copolymerized repeating units are connected through the intermediation of specific urethane connecting groups. Therefore, the lactide copolymer can exhibit more improved mechanical properties, and it may be further improved due to higher molecular weight. Moreover, since the lactide copolymer has the connecting structure intermediated by the specific urethane connecting groups, it can satisfy proper melt viscosity and excellent processability at the same time.

In addition, since the lactide copolymer and the packaging film including the same include the soft segment of the polyether polyol repeating unit, they can show the characteristics of apparently improved flexibility (for example, high elongation and low modulus) and excellent transparency at the same time.

Therefore, the packaging film including the lactide copolymer disclosed above can be very preferably used as packaging materials of various fields including a packaging material for food.

At second, the preparation method of said lactide copolymer is concretely explained. The preparation method of the lactide copolymer may include the steps of: forming the block copolymer of Chemical Formula 1a by carrying out a ring opening polymerization of a lactide monomer in the presence of a catalyst containing tin or zinc and an initiator including a polyether polyol polymer; and reacting the block copolymer of Chemical Formula 1a with a polyvalent isocyanate compound of which the average equivalent of isocyanate group per a molecule is more than 2 and less than 3:

[Chemical Formula 1a]

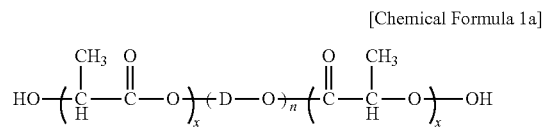

in Chemical Formula 1a, D is a $C_2$-$C_{10}$ linear or branched alkylene group, x is independently an integer of 30 to 500, and n is an integer of 30 to 1,000.

According to such preparation method, said lactide copolymer can be prepared by forming the hard segment of the polylactide repeating unit and linking the same to the soft segment derived from the polyether polyol polymer initiator so as to prepare the block copolymer of Chemical Formula 1a in the first step, and linking the same to a certain polyvalent diisocyanate compound again in the second step.

At this time, the polyether polyol polymer acts as a kind of macro-initiator when the polylactide repeating unit, the hard segment, is formed. Namely, such macro-initiator initiates the reaction by being linked to the lactide monomer in company with the organic metal catalyst while opening the ring, and the chain is continuously extended so as to form the hard segment and the block copolymer including the same. Namely, since the hydroxyl groups of both ends of the polyether polyol polymer initiates the ring opening polymerization and extends the chain, the block copolymer formed by this can have the structure in which the hard segments are linked to both ends of the polyether polyol polymer, namely, the soft segment.

Therefore, said lactide copolymer can be prepared by reacting the block copolymer formed like this with the polyvalent isocyanate compound.

In such preparation method, the catalyst containing tin or zinc may be a catalyst including the organic metal complex of Chemical Formula 2 or a mixture of the compounds of Chemical Formulae 3 and 4 disclosed above. By using such specific catalyst, the lactide copolymer prepared finally can satisfy the low residual metal content and high molecular weight range, and can satisfy excellent properties disclosed above. As the result, the lactide copolymer can exhibit more improved hydrolysis resistance and heat resistance while having higher molecular weight than prior known polymers and excellent mechanical properties due to this, because degradation in use is suppressed due to the low residual metal content. It is because said catalyst shows superior polymerization activity to prior catalysts used and makes it possible to prepare the hard segment and the lactide copolymer having high molecular weight even with small quantity.

Namely, due to excellent activity of the catalyst, the lactide copolymer having higher molecular weight can be prepared in the presence of small quantity of catalyst, and depolymerization or degradation during or after the polymerization can be suppressed. Therefore, the copolymer can exhibit more excellent mechanical properties and superior hydrolysis resistance in high temperatures and humidity condition, because the content of residual monomer and catalyst remaining in the lactide copolymer after the polymerization can be minimized.

And, the lactide copolymer shows lower acidity than known. Accordingly, it can be prevented that the lactide copolymer or a product prepared from the same are degraded or their molecular weight decreases in use, and thus they can show more improved hydrolysis resistance or heat resistance. Further, the mechanical and physical properties (flexibility and so on) of the lactide copolymer can be maintained more excellently.

Unlimited principal and cause of this are explained as follows.

In the preparation process of the lactide (co)polymer, for example, a catalyst containing tin or zinc is used for the ring opening polymerization, and parts of such catalyst remain inevitably in the final (co)polymer prepared. However, such residual catalyst may be combined to the end of the (co) polymer, and such combination may generate a transesterification reaction with carboxylic acid and the like, and cause degradation of the (co)polymer or decrease of its molecular weight. Furthermore, the residual lactide monomer is easily hydrolyzed in high temperatures and humidity condition and generates carboxylic acid, and it may promote hydrolysis of the (co)polymer and decrease the molecular weight.

But, as disclosed above, the lactide copolymer prepared by said method can have high molecular weight, even while having low content of the residual metal came from the catalyst and low content of the residual lactide monomer. Due to this, degradation or molecular weight decrease caused by the residual metal or the residual lactide monomer can be minimized, and excellent mechanical properties due to high molecular weight can be exhibited and maintained.

Consequently, through the method disclosed above, the lactide copolymer which can exhibit and maintain superior mechanical properties while having improved flexibility and has no problem of toxicity or pollution caused by residual metal and the like, and the packaging film including the same can be prepared preferably.

Meanwhile, in the preparation method of the lactide copolymer, the lactide monomer may be L-lactide or D-lactide which is a cyclic monomer obtained from L-lactic acid or D-lactic acid. More preferably, by considering melting temperature and heat resistance of the lactide copolymer, it is preferable to use L-lactide or D-lactide having an optical purity of 98% or more as the lactide monomer.

And, the ring opening polymerization may be carried out at the temperature of about 120 to 200° C. or about 120 to 190° C., for about 0.5 to 8 hours or about 1 to 7 hours.

Furthermore, in the ring opening polymerization, the complex of Chemical Formula 2 or the mixture of the compounds of Chemical Formulae 3 and 4 may be used as the catalyst. At this time, the catalyst may be used with a molar ratio (mole/mole ratio) of about 1:10,000~1:200,000 compared to the lactide monomer. If the adding ratio of the catalyst is too small, it is not preferable because the polymerization activity is insufficient, on the contrary, if the adding ratio of the catalyst is excessively large, the content of residual catalyst in the lactide copolymer becomes high and it may cause degradation of the copolymer or decrease of the molecular weight.

And, it is preferable to carry out the ring opening polymerization according to a substantially solvent-free bulk polymerization. At this time, the meaning of 'substantially solvent-free' may include the case using a small quantity of solvent for dissolving the catalyst, for example, less than about 1 ml of solvent at most per 1 kg of the lactide monomer used.

Since the ring opening polymerization is carried out according to a bulk polymerization, it becomes possible to omit the process for eliminating solvent after polymerization, and degradation or loss of the copolymer in the solvent elimination process can be suppressed. And, the lactide copolymer can be prepared with high conversion rate and yield rate by the bulk polymerization.

And, in the step of reacting the block copolymer with the polyvalent isocyanate compound after the ring opening polymerization, the polyvalent isocyanate compound of which the average equivalent of isocyanate group per a molecule is more than 2 and less than 3 may be used as the polyvalent isocyanate compound, and the explanation about the same is skipped here because it is the same as disclosed above.

Furthermore, the polyvalent isocyanate compound may be used in the amount of about 0.05 to 5 parts by weight, about 0.1 to 4 parts by weight, or about 0.2 to 2 parts by weight, per 100 parts by weight of the block copolymer of Chemical Formula 1a. If the amount used of the polyvalent isocyanate compound is too low, the molecular weight, viscosity, or mechanical properties of the lactide copolymer may be insufficient, on the other hand, if the amount used is excessively high, the molecular weight of the lactide copolymer becomes too high and it may gelate.

And, the reaction with the polyvalent isocyanate compound may be carried out at the temperature of about 100 to 190° C. for about 0.001 to 1 hours. However, the range is not limited particularly if it is a common reaction condition for forming a urethane bond.

And, the reaction with the polyvalent isocyanate compound may be carried out in the presence of a tin-based catalyst. As the example of such tin-based catalyst, stannous octoate, dibutyltin dilaurate, dioctyltin dilaurate, and the like may be used.

According to the preparation method disclosed above, it is possible to prepare the lactide copolymer having excellent mechanical properties, flexibility, processability, and so on with high conversion rate, due to its structural characteristic, high molecular weight, and proper melt viscosity.

Therefore, the packaging film including the lactide copolymer can also exhibit excellent mechanical properties, flexibility, transparency, hydrolysis resistance, and heat resistance, and can be preferably used as various packaging materials including food packaging, because the concern about toxicity or pollution by residual catalyst or monomer is minimized.

The packaging film may have various thicknesses according to its uses, and it may have the thickness of about 10 to 100 μm. For example, if it is used as a packaging film like a wrap film or an envelope, it may have the thickness of about 10 to 50 μm, about 10 to 30 μm, or about 15 to 25 μm in the aspects of flexibility, handling property, and strength.

Furthermore, the packaging film may have the tensile strength of about 200 to 800 kg/cm$^2$, the elongation of about 10 to 150%, and the modulus of about 100 to 450 kg/mm$^2$, in machine direction (MD) and transverse direction (TD), when the film with dimensions of the width of 6 mm and the length of 120 mm is subjected to a tensile test using Instron UTM at the temperature of 20° C., the relative humidity of 65%, and the drawing speed of 30 mm/min with the distance between grips of 100 mm. More specifically, the tensile strength may be about 250 to 750 kg/cm$^2$ or about 300 to 700 kg/cm$^2$, the elongation may be about 15 to 130% or about 20 to 100%, and the modulus may be about 125 to 400 kg/mm$^2$ or about 150 to 350 kg/mm$^2$, in machine direction and transverse direction.

Such range of tensile strength, elongation, and modulus may reflect excellent flexibility and mechanical properties of the packaging film. Furthermore, since the packaging film includes the lactide copolymer disclosed above, it is possible to use the film more easily without the problem of that the film is torn by a biaxial drawing impact or is rustling.

If the tensile strength of the packaging film is too low, the film may undergo spreading or loosing phenomena during a film formation process, and exhibit poor workability, gas permeability, or slit forming property. In addition, the deficient slipping property causes a poor release property or makes it difficult to use the film effectively as a wrap film because the film deforms before wrapping a good such as a vessel or a food. On the other hand, if the tensile strength is too high, a folding line may remain giving a poor appearance once it is formed in the film, or the film is not easily folded after the shape of the subject to be packaged and thus the packaging may become difficult.

And, if the elongation is too low or the modulus is excessively high, the flexibility may be insufficient, and thus it may be difficult to package effectively as the use of vessel or food packaging film. On the other hand, if the elongation is excessively high or the modulus is too low, the film may undergo spreading or loosing phenomena during a film formation process, and exhibits poor workability, gas permeability, or slit forming property, or the handling property of the film may become poor and the film may be easily broken and may cause damage to the contents after packaging.

Also, when it is treated for 1 hr in a 100° C. hot wind oven, the packaging film may exhibit a weight loss of about 3 wt % or less, about 2 wt % or less, or about 1 wt % or less. This property may indicate that the packaging film may have excellent heat resistance and anti-bleed out properties. If the rate of weight loss is higher than 3 wt %, the film may have poor dimensional stability, and plasticizers, residual monomers, or additives can bleed out of the film, polluting the content packaged with the film.

And, the packaging film may exhibit the haze of about 20% or less, for example about 0 to 20%, and the light transmittance of about 80% or higher, for example about 80 to 100%. In one embodiment, the haze may be about 10% or less and the transmittance may be about 85% or more, and in another embodiment, the haze may be about 5% or less and the transmittance may be about 90% or more. If the haze is too high or the light transmittance is too low, the film may make it difficult to readily identify the content packaged therewith, and do not allow vivid appearance of a printed image when it is applied to a multilayer film having a print layer.

And, it is all right to provide the properties required for a packaging material for food such as heat sealability, gas barrier against water vapor, oxygen or carbonic acid gas, releasability, printability, and the like to the packaging film with necessity, so long as not deteriorating the advantages of the packaging film. For this, the polymer having such properties may be compounded with the film or a thermoplastic resin such as an acryl resin, a polyester resin, a silicon resin, a polyester resin, or a silicon resin, or an antistatic agent, a surfactant, and/or a releasing agent may be coated on at least one surface of the packaging film. Also, the packaging film may be formed into a multilayer film by coextrusion of other films such as polyolefin sealant. The packaging film may be formed into a multilayer film by adhesion or lamination as well.

Meanwhile, a typical method may be used to manufacture the packaging film mentioned above. For example, the polylactide copolymer may be formed into a drawn film, specifically a biaxial drawn film, by an inflation process, a sequential biaxial stretching process, or a concurrent biaxial stretching process, followed by heat setting. In this regard, the formation of the drawn film may be accomplished by melt extruding the polylactide copolymer into a sheet structure with an extruder equipped with a T die, thereafter cooling and solidifying the sheet-like extrudate to form an undrawn film, and stretching the undrawn film in both machine direction and transverse direction.

Drawing conditions of the film may be properly adjusted depending on heat shrinkability, dimensional stability, strength, and Young's modulus. For example, in consideration of the strength and flexibility of the final product, the drawing temperature may be preferably adjusted into a point between the glass transition temperature and the crystallization temperature of the polylactic acid resin. In addition, the drawing ratio may be set to be about 1.5 to 10 times for each direction, or may differ from the machine direction to the transverse direction.

After the formation of the oriented film, the packaging film may be finally accomplished by heat setting, and the heat setting is preferably performed at 100° C. or higher for about 10 sec for the strength and dimensional stability of the film.

In another embodiment, the packaging film may be formed into a blown film by a blown process. In the case of prior known polylactide resin, the blown process itself is impossible, but it is recognized that the packaging film of one embodiment can be formed into a blown film by the blown process as it includes a specific lactide copolymer superior in processability. At this time, the condition of the blown process follows a common condition, and it is recognized that such blown film shows excellent mechanical properties and flexibility and can be properly used as a packaging film of various fields.

Even after being stored for a long period time, the packaging film may have excellent flexibility and transparency, and exhibit sufficient mechanical properties such as strength and anti-bleed out property. In addition, the film may have biodegradability unique to the polylactide copolymer.

Therefore, the packaging film may be preferably applied to various packaging fields. For example, the packaging film may be applied to industrial packaging materials including agricultural multi-films, sheets for protecting paint on automobiles, trash envelopes, and compost envelopes in addition to being used as, for example, wrappers and envelopes for daily consumption goods or foods, and chilled/frozen foods, shrinkable over-wrapping films, bundling films, sanitary films such as sanitary pads or diapers, and mat films for packaging confectioneries.

Effects of the Invention

The packaging film of the present invention exhibits excellent flexibility, transparency, heat resistance, and processability, while showing and maintaining superior mechanical properties, and there is almost no concern about pollution or toxicity by residual catalyst and monomer. Furthermore, the film includes the lactide copolymer and can show biodegradability unique to the same. Therefore, the packaging film can be very preferably applied as various packaging materials such as a packaging material for food.

BRIEF DESCRIPTION OF THE DRAWINGS

FIG. 1 is the $^1$H NMR spectrum of the lactide copolymer of Example 1.

EXAMPLES

The present invention will be explained in detail with reference to the following examples. However, these examples are only to illustrate the invention, and the scope of the invention is not limited thereto.

[Experiment Methods]

In the following Examples and Comparative Examples, standard Schlenk technique or a dry box technique was applied for dealing with a compound sensitive to air or water.

And, in the following Examples, the definitions and measuring methods of each property are as follows.

(1) Content of polylactide and polyether polyol repeating unit (wt %): by using a 600 Mhz nuclear magnetic resonance (NMR) spectrometer, the content of each repeating unit in the block copolymerized repeating unit included in the prepared lactide copolymer was measured by $^1$H NMR.

(2) Tg and Tm (° C.): measured with a differential scanning calorimeter (manufactured by TA Instruments) while increasing the temperature of the sample at the rate of 10° C./minute, after melting and quenching the sample. Tg was determined from the mid value of tangential line of an endothermic curve and a base line, and Tm was determined from the maximum value of the melt endothermic peak of crystal.

(3) Molecular weight and molecular weight distribution: measured by using a gel permeation chromatography (GPC), at this time, a polystyrene sample was used as a standard.

(4) Content of residual lactide (wt %): by using a 600 Mhz nuclear magnetic resonance (NMR) spectrometer, the content of residual lactide in the lactide copolymer, based on the lactide copolymer, was measured by $^1$H NMR.

Synthesis Example 1

After putting each of Sn(Oct)$_2$ (Aldrich Co., Ltd.) (0.2 g, 0.49 mmol) and the compound of the following Chemical Formula 5 (TCI Co., Ltd.) (0.36 g, 1.0 mmol) in a 100 mL flask, 30 mL of toluene was added thereto and the mixture was stirred at 100° C. for 1 hour. And then, the solvent was eliminated therefrom in a vacuum and the remains are washed with heptane solvent and dried, and 0.36 g of organic metal complex A was obtained.

[Chemical Formula 5]

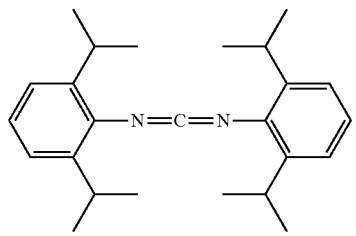

Synthesis Example 2

After putting each of Sn(Oct)$_2$ (Aldrich Co., Ltd.) (0.2 g, 0.49 mmol) and the compound of the following Chemical Formula 6 (Rhein Chemie Co., Ltd.) (0.36 g) in a 100 mL flask, 0.4 g of organic metal complex B was obtained according to the same method as in Synthesis Example 1.

Referring to $^{13}$C NMR spectrum of organic metal complex B, three carbonyl peaks are shown at δ 188, 183, and 182 ppm in the reaction of Sn(Oct)$_2$ catalyst and the compound of Chemical Formula 6. The very sharp peak at δ 183 is the peak corresponding to Oct-H acid compound linked to the compound of Chemical Formula 6, the broad peak shown at δ 188 ppm is the peak corresponding to free Sn(Oct)$_2$, and the broad peak shown at δ 182 ppm is the peak corresponding to the organic metal complex to which the compound of Chemical Formula 6 is coordinated.

[Chemical Formula 6]

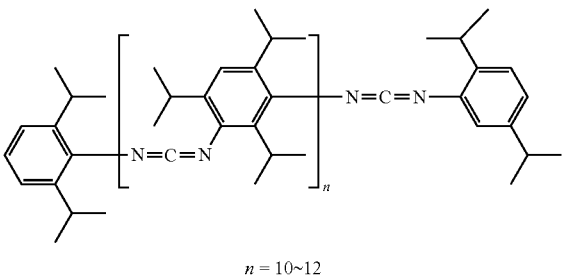

$n = 10$~$12$

Example 1

After feeding L-lactide monomer (100 kg, 693.82 mol) and organic metal complex A of Synthesis Example 1 (102.81 g) into an 150 L reactor equipped with a nitrogen tube, a stirrer, a catalyst inlet, and a vacuum system, the block copolymer of Chemical Formula 1a was pre pared by adding polypropyleneglycol (number average molecular weight: 6000 g/mol, 17.65 kg) thereto and carrying out the ring opening polymerization at the temperature of 180° C. for 3 hours. After taking the sample of the polymerized resin from the reactor, the weight average molecular weight of the sample was measured by using a gel permeation chromatography (GPC) and the sample showed the weight average molecular weight of 95,000.

Subsequently, after feeding 0.59 kg of the polyvalent isocyanate compound of which the average equivalent of isocyanate group per a molecule was about 2.7 (mixture of MDI of which the equivalent of isocyanate group was 2.0 and hexamethylene diisocyanate isocyanurate of which the equivalent of isocyanate group was 3.0) in the polymerization reactor, the addition polymerization with the block copolymer of Chemical Formula 1a was carried out at the temperature of 180° C. for 30 minutes so as to form the urethane connecting group.

After the reaction was completed, the lactide copolymer including two or more block copolymerized repeating units of Chemical Formula 1 was obtained by eliminating the residual lactide through a common volatilizing process. The content of residual lactide, weight average molecular weight, glass transition temperature, and melting temperature of the prepared lactide copolymer were measured and the results are listed in Table 1. And, the $^1$H NMR spectrum of the lactide copolymer of Example 1 is as illustrated in FIG. 1.

Example 2

The lactide copolymer of Example 2 was prepared substantially according to the same method as in Example 1, except that polypropyleneglycol (number average molecular weight: 6,000 g/mol, 25 kg) was fed, and 1.25 kg of the polyvalent isocyanate compound of which the average equivalent of isocyanate group per a molecule was about 2.7 (mixture of MDI of which the equivalent of isocyanate group was 2.0 and hexamethylene diisocyanate isocyanurate of which the equivalent of isocyanate group was 3.0) was fed and reacted with the block copolymer of Chemical Formula 1a. The content of residual lactide, weight average molecular weight, glass transition temperature, and melting temperature of the same were measured and the results are listed in Table 1.

Example 3

The lactide copolymer of Example 3 was prepared substantially according to the same method as in Example 1, except that polypropyleneglycol (number average molecular weight: 6,000 g/mol, 33.33 kg) was fed, and 1.66 kg of the polyvalent isocyanate compound of which the average equivalent of isocyanate group per a molecule was about 2.7 (mixture of MDI of which the equivalent of isocyanate group was 2.0 and hexamethylene diisocyanate isocyanurate of which the equivalent of isocyanate group was 3.0) were fed and reacted with the block copolymer of Chemical Formula 1a. The content of residual lactide, weight average molecular weight, glass transition temperature, and melting temperature of the same were measured and the results are listed in Table 1.

Example 4

The lactide copolymer of Example 4 was prepared substantially according to the same method as in Example 1, except that polyethyleneglycol (number average molecular weight: 6,000 g/mol, 11.11 kg) was fed instead of polypropylene glycol. The content of residual lactide, weight average molecular weight, glass transition temperature, and melting temperature of the same were measured and the results are listed in Table 1.

Example 5

The lactide copolymer of Example 5 was prepared substantially according to the same method as in Example 2, except that polyethyleneglycol (number average molecular weight: 6,000 g/mol, 25 kg) was fed instead of polypropylene glycol. The content of residual lactide, weight average molecular weight, glass transition temperature, and melting temperature of the same were measured and the results are listed in Table 1.

Example 6

The lactide copolymer of Example 6 was prepared substantially according to the same method as in Example 1, except that the polyvalent isocyanate compound of which the average equivalent of isocyanate group per a molecule was about 2.5 (mixture of MDI of which the equivalent of isocyanate group was 2.0 and hexamethylene diisocyanate isocyanurate of which the equivalent of isocyanate group was 3.0) was used as the polyvalent isocyanate compound. The content of residual lactide, weight average molecular weight, glass transition temperature, and melting temperature of the same were measured and the results are listed in Table 1.

Example 7

The lactide copolymer of Example 7 was prepared substantially according to the same method as in Example 2, except that the polyvalent isocyanate compound of which the average equivalent of isocyanate group per a molecule was about 2.5 (mixture of MDI of which the equivalent of isocyanate group was 2.0 and hexamethylene diisocyanate isocyanurate of which the equivalent of isocyanate group was 3.0) was used as the polyvalent isocyanate compound. The content of residual lactide, weight average molecular weight, glass transition temperature, and melting temperature of the same were measured and the results are listed in Table 1.

Example 8

The lactide copolymer of Example 8 was prepared substantially according to the same method as in Example 3, except that the polyvalent isocyanate compound of which the average equivalent of isocyanate group per a molecule was about 2.5 (mixture of MDI of which the equivalent of isocyanate group was 2.0 and hexamethylene diisocyanate isocyanurate of which the equivalent of isocyanate group was 3.0) was used as the polyvalent isocyanate compound. The content of residual lactide, weight average molecular weight, glass transition temperature, and melting temperature of the same were measured and the results are listed in Table 1.

Example 9

The lactide copolymer of Example 9 was prepared substantially according to the same method as in Example 4, except that the polyvalent isocyanate compound of which the average equivalent of isocyanate group per a molecule was about 2.5 (mixture of MDI of which the equivalent of isocyanate group was 2.0 and hexamethylene diisocyanate isocyanurate of which the equivalent of isocyanate group was 3.0) was used as the polyvalent isocyanate compound. The content of residual lactide, weight average molecular weight, glass transition temperature, and melting temperature of the same were measured and the results are listed in Table 1.

Example 10

The lactide copolymer of Example 10 was prepared substantially according to the same method as in Example 5, except that the polyvalent isocyanate compound of which the average equivalent of isocyanate group per a molecule was about 2.5 (mixture of MDI of which the equivalent of isocyanate group was 2.0 and hexamethylene diisocyanate isocyanurate of which the equivalent of isocyanate group was 3.0) was used as the polyvalent isocyanate compound. The content of residual lactide, weight average molecular weight, glass transition temperature, and melting temperature of the same were measured and the results are listed in Table 1.

Comparative Example 1

The lactide copolymer of Comparative Example 1 was prepared substantially according to the same method as in Example 1, except that 0.3 kg of the polyvalent isocyanate compound of which the average equivalent of isocyanate group per a molecule was 2 (diphenylmethane-2,4'-diisocyanate (MDI)) was used as the polyvalent isocyanate compound and reacted with the block copolymer of Chemical Formula 1a. The content of residual lactide, weight average molecular weight, glass transition temperature, and melting temperature of the same were measured and the results are listed in Table 2.

Comparative Example 2

The lactide copolymer of Comparative Example 2 was prepared substantially according to the same method as in Comparative Example 1, except that 0.59 kg of the polyvalent isocyanate compound of which the average equivalent of isocyanate group per a molecule was 2 (diphenylmethane-2,4'-diisocyanate (MDI)) was used as the polyvalent isocyanate compound and reacted with the block copolymer of Chemical Formula 1a. The content of residual lactide, weight average molecular weight, glass transition temperature, and melting temperature of the same were measured and the results are listed in Table 2.

Comparative Example 3

The lactide copolymer of Comparative Example 3 was prepared substantially according to the same method as in Comparative Example 1, except that 1.25 kg of the polyvalent isocyanate compound of which the average equivalent of isocyanate group per a molecule was 2 (1,6-hexamethylene diisocyanate (HDI)) was used as the polyvalent isocyanate compound and reacted with the block copolymer of Chemical Formula 1a. The content of residual lactide, weight average molecular weight, glass transition temperature, and melting temperature of the same were measured and the results are listed in Table 2.

Comparative Example 4

The lactide copolymer of Comparative Example 4 was prepared substantially according to the same method as in Comparative Example 1, except that the polyvalent isocyanate compound of which the average equivalent of isocyanate group per a molecule was 3 (hexamethylene diisocyanate isocyanurate) was used as the polyvalent isocyanate compound. The content of residual lactide, weight average molecular weight, glass transition temperature, and melting temperature of the same were measured and the results are listed in Table 2.

Comparative Example 5

The lactide copolymer of Comparative Example 5 was prepared substantially according to the same method as in Example 4, except that polyethyleneglycol was not fed. The content of residual lactide, weight average molecular weight, glass transition temperature, and melting temperature of the same were measured and the results are listed in Table 2.

TABLE 1

|  | Example | | | | |
| --- | --- | --- | --- | --- | --- |
|  | 1 | 2 | 3 | 4 | 5 |
| Mw (g/mol) | 244,000 | 235,000 | 231,000 | 245,000 | 229,000 |
| Mn (g/mol) | 95,000 | 87,000 | 84,000 | 107,000 | 88,000 |
| PDI* (Mw/Mn) | 2.57 | 2.70 | 2.75 | 2.29 | 2.60 |
| Tg (° C.) | 48 | 51 | 47 | 47 | 49 |
| Tm (° C.) | 169 | 171 | 171 | 168 | 167 |
| Content of polylactide repeating unit (wt %) | 85 | 80 | 75 | 90 | 80 |
| Content of polyether polyol repeating unit (wt %) | 15 | 20 | 25 | 10 | 20 |
| Residual lactide (wt %) | 0.5 | 0.6 | 0.5 | 0.5 | 0.4 |

|  | Example | | | | |
| --- | --- | --- | --- | --- | --- |
|  | 6 | 7 | 8 | 9 | 10 |
| Mw (g/mol) | 236,000 | 232,000 | 224,000 | 243,000 | 222,000 |
| Mn (g/mol) | 95,000 | 88,000 | 81,000 | 107,000 | 87,000 |
| PDI* (Mw/Mn) | 2.48 | 2.64 | 2.77 | 2.27 | 2.55 |
| Tg (° C.) | 48 | 48 | 50 | 49 | 46 |
| Tm (° C.) | 168 | 172 | 171 | 171 | 169 |
| Content of polylactide repeating unit (wt %) | 85 | 80 | 75 | 90 | 80 |
| Content of polyether polyol repeating unit (wt %) | 15 | 20 | 25 | 10 | 20 |
| Residual lactide (wt %) | 0.5 | 0.6 | 0.7 | 0.5 | 0.6 |

*PDI: indicates polydispersity index

TABLE 2

|  | Comparative Example | | | | |
|---|---|---|---|---|---|
|  | 1 | 2 | 3 | 4 | 5 |
| Mw (g/mol) | 171,000 | 145,000 | 212,000 | Not measurable | 434,000 |
| Mn (g/mol) | 90,000 | 85,000 | 101,000 | Not measurable | 275,000 |
| PDI* (Mw/Mn) | 1.90 | 1.71 | 2.10 | Not measurable | 1.58 |
| Tg (° C.) | 50 | 51 | 51 | 50 | 55 |
| Tm (° C.) | 169 | 169 | 170 | 172 | 173 |
| Content of polylactide repeating unit (wt %) | 90 | 90 | 90 | 90 | 100 |
| Content of polyether polyol repeating unit (wt %) | 10 | 10 | 10 | 10 | 0 |
| Residual lactide (wt %) | 0.8 | 0.8 | 0.5 | Not measurable | 0.2 |

Referring to Table 1, it is recognized that the lactide copolymers of Examples 1 to 10 have higher molecular weight than Comparative Examples 1 to 3, and particularly, when the Examples and the Comparative Examples are compared, it is recognized that the lactide copolymers of Examples obtained by using the polyvalent isocyanate compound of which the average equivalent of isocyanate group per a molecule is more than 2 and less than 3 have higher molecular weight than that of Comparative Example obtained by using diisocyanate compound, even in the same polymerization condition. Such lactide copolymers of Examples are expected to have superior mechanical properties according to high molecular weight to Comparative Examples.

And, in the case of Comparative Example 4 using the compound of which the average equivalent of isocyanate group per a molecule was 3 or more, it is recognized that the molecular weight was not measurable because of intensified gelation and post-processing was impossible after the reaction.

Experimental Example 1

Measurement on Mechanical Properties

Specimens of the polylactide resin Examples 1 to 10, Comparative Examples 1 to 5, and NatureWorks 4032D commercially on sale were prepared by using an injection molder of HAAKE Minijet II for measuring tensile strength. The specimens were prepared at 200° C. and the mechanical properties of each specimen were measured. The evaluation results are listed in Tables 3 and 4.

The mechanical properties of the specimen were measured and evaluated by the following methods.

(1) Tensile strength (kg/cm$^2$): the tensile strength of the prepared specimen was measured by using Universal test machine of INSTRON Co., Ltd. according to ASTM D 882. A mean value of five measurements was expressed as the result.

(2) Elongation (%): the elongation was determined at the point when the film was torn under the same condition as in the tensile strength test of (1) and a mean value of five measurements was expressed as the result.

(3) Modulus (GPa): the initial slope between 0 to 1% strain range was calculated in the stress-strain curve obtained in the tensile strength measurement using Universal test machine of INSTRON Co., Ltd. A mean value of five measurements was expressed as the result.

TABLE 3

|  | Example | | | | | | | | | |
|---|---|---|---|---|---|---|---|---|---|---|
|  | 1 | 2 | 3 | 4 | 5 | 6 | 7 | 8 | 9 | 10 |
| Tensile Strength (kg/cm$^2$) | 458 | 390 | 424 | 446 | 376 | 418 | 413 | 348 | 395 | 425 |
| Elongation (%) | 44 | 49 | 51 | 48 | 55 | 45 | 60 | 50 | 52 | 40 |
| E-Modulus (GPa) | 1.75 | 1.66 | 1.79 | 1.63 | 1.73 | 1.72 | 1.77 | 1.65 | 1.68 | 1.71 |

TABLE 4

|  | Comparative Example | | | | | |
|---|---|---|---|---|---|---|
|  | 1 | 2 | 3 | 4 | 5 | 4032D |
| Tensile Strength (kg/cm$^2$) | 467 | 457 | 454 | 480 | 545 | 702 |
| Elongation (%) | 18 | 31 | 12 | 15 | 13 | 8 |
| E-Modulus (GPa) | 1.8 | 1.83 | 1.8 | 2 | 2.3 | 2.43 |

Referring to Tables 3 and 4, it is recognized that the lactide copolymers prepared in Examples show the tensile strength similar or superior to Comparative Examples and show improved flexibility compared to Comparative Examples because of high elongation and low modulus. In comparison, the copolymers of Comparative Examples 1 to 5 and 4032D show poor flexibility because they show very low elongation and high E-modulus compared to Examples.

From this, it is recognized that the lactide copolymers of Examples have excellent flexibility suitable to be used as a packaging material.

Experimental Example 2

Measurement on Melt Index (MI; g/min)

The melt index was measured by using an MI analyzer. After feeding about 5 g of lactide copolymer into a cylinder and heating the same at 190° C. for about 4 minutes so as to be melted, the weight of the lactide copolymer discharged for 60 seconds from the outlet was measured by pressing the same with the weight of 2.16 kg and the result was converted into the unit of g/10 min.

TABLE 5

| | Example | | | | | | | | | |
|---|---|---|---|---|---|---|---|---|---|---|
| | 1 | 2 | 3 | 4 | 5 | 6 | 7 | 8 | 9 | 10 |
| Melt Index (g/min) | 15.2 | 11.5 | 10.8 | 16.1 | 12.5 | 19.6 | 20.1 | 15.6 | 18.6 | 13.4 |

TABLE 6

| | Comparative Example | | | | |
|---|---|---|---|---|---|
| | 1 | 2 | 3 | 4 | 5 |
| Melt Index (g/min) | 86.3 | 89.5 | 41.2 | 1.3 | 0.9 |

Referring to Tables 5 and 6, it is recognized that the lactide copolymers prepared in Examples show proper melt index and melt viscosity and are suitable to melt processing but the copolymers of Comparative Examples 1 to 3 show excessively high melt index and low melt viscosity and show poor processability. Particularly, in the case of using the compound of which the average equivalent of isocyanate group per a molecule is 2 as in Comparative Examples 1 to 3, it is recognized that it is difficult to lower the melt index properly even though an excess of the compound is used.

And, it is recognized that Comparative Example 4 cannot avoid the problem of gelation shown in Tables 1 and 2 and its processability is poor too.

Experimental Example 3

Measurement on the Amount of Residual Catalyst

The amount of the residual catalyst in the lactide copolymer was measured according to an inductively coupled plasma emission spectroscopy.

The results (the amount of residual catalyst) of the copolymers of Examples 1 to 3 are listed in Table 7.

TABLE 7

| | Amount of residual catalyst(ppm) |
|---|---|
| Example 1 | 5 |
| Example 2 | 8 |
| Example 3 | 5 |

Referring to Table 7, it is recognized that the lactide copolymer prepared in Examples show small amount of residual catalyst (metal) of less than 10 ppm.

Experimental Example 4

Preparation of Drawn Film and Measurement on the Film Properties

The polylactide copolymer prepared in Examples and Comparative Examples and 4032D of Experimental Example 1 were dried at 50° C. for 24 hours under a vacuum condition of 10 torr, and extruded into a sheet structure by using a 45ϕ single screw extruder equipped with a T die of 300 mm width with the extrusion temperature conditions shown in Tables 8 and 9. The extruded sheets were casted on a drum cooled to 30-50° C. to give undrawn films. The undrawn films were drawn 2 to 3 times in machine direction between heating roles under the drawing conditions shown in Tables 8 and 9. Subsequently, the films drawn in machine direction were fixed with clips and guided into a tenter frame, and then the films were drawn 2 to 3 times in transverse direction and fixed again in the transverse direction, followed by heat treatment at 120° C. for 60 seconds to afford a bi-axially drawn film of 20 μm thick. The evaluation results of the films are listed in Tables 8 and 9.

The properties of such films were measured and evaluated by the following methods.

(1) Tensile strength (kg/cm$^2$): the tensile strength of the prepared film having the dimension of 120 mm in length and 6 mm in width was measured by using Universal test machine of INSTRON Co., Ltd. according to ASTM D 882 with a drawing speed of 300 mm/min and the distance of 100 mm between grips. A mean value of five measurements was expressed as the result and MD and TD stand for machine direction and transverse direction of the film, respectively.

(2) Elongation (%): the elongation was determined at the point when the film was torn under the same condition as in the tensile strength test of (1) and a mean value of five measurements was expressed as the result. MD and TD stand for machine direction and transverse direction of the film, respectively.

(3) Modulus (GPa): the initial slope between 0 to 1% strain range was calculated in the stress-strain curve obtained in the tensile strength measurement using Universal test machine of INSTRON Co., Ltd. A mean value of five measurements was expressed as the result.

(4) Haze (%): haze was measured by using a haze meter of Nihon Semitsu Kogaku Co., Ltd.

TABLE 8

| | Example | | | | | | | | | |
|---|---|---|---|---|---|---|---|---|---|---|
| | 1 | 2 | 3 | 4 | 5 | 6 | 7 | 8 | 9 | 10 |
| Extrusion Temp. (° C.) | 190 | 190 | 190 | 190 | 190 | 190 | 190 | 190 | 190 | 190 |
| Drawing Temp. (° C.) | 80 | 80 | 80 | 80 | 80 | 80 | 80 | 80 | 80 | 80 |
| Drawing Time (sec) | 40 | 40 | 40 | 40 | 40 | 40 | 40 | 40 | 40 | 40 |
| Drawing Ratio | 2.5 | 2.5 | 2.5 | 2.5 | 2.5 | 2.5 | 2.5 | 2.5 | 2.5 | 2.5 |
| Thickness of Film (μm) | 20 | 20 | 20 | 20 | 20 | 20 | 20 | 20 | 20 | 20 |
| Tensile Strength (kg/cm$^2$), MD | 650 | 670 | 600 | 580 | 620 | 600 | 620 | 590 | 600 | 610 |
| Tensile Strength (kg/cm$^2$), TD | 730 | 730 | 720 | 680 | 690 | 630 | 650 | 750 | 590 | 610 |
| Elongation (%), MD | 81.5 | 71.3 | 40.7 | 91.5 | 75.8 | 94.3 | 90.5 | 75.8 | 50.4 | 40.8 |
| Elongation (%), TD | 58.7 | 60.5 | 45.8 | 57.5 | 61.8 | 74.3 | 66.5 | 40.5 | 85.3 | 61.8 |
| Modulus (kg/mm$^2$) | 250 | 280 | 220 | 225 | 335 | 300 | 230 | 200 | 210 | 210 |
| Haze (%) | 0.7 | 0.8 | 0.8 | 0.7 | 0.9 | 0.8 | 0.8 | 0.9 | 1 | 0.8 |

TABLE 9

| | Comparative Example | | | | | |
|---|---|---|---|---|---|---|
| | 1 | 2 | 3 | 4 | 5 | 4032D |
| Extrusion Temp. (° C.) | 190 | 190 | 190 | 190 | 190 | 190 |
| Drawing Temp. (° C.) | 80 | 80 | 80 | 80 | 80 | 80 |
| Drawing Time (sec) | 40 | 40 | 40 | 40 | 40 | 40 |
| Drawing Ratio | 2.5 | 2.5 | 2.5 | 2.5 | 2.5 | 2.5 |
| Thickness of Film (μm) | 20 | 20 | 20 | 20 | 20 | 20 |
| Tensile Strength (kg/cm$^2$), MD | 300 | 350 | 320 | Not measurable | 720 | 870 |
| Tensile Strength (kg/cm$^2$), TD | 350 | 360 | 300 | Not measurable | 750 | 770 |
| Elongation (%), MD | 34.5 | 19.5 | 33.5 | Not measurable | 31.1 | 22 |
| Elongation (%), TD | 30.5 | 20.5 | 21.5 | Not measurable | 25.8 | 18 |
| Modulus (kg/mm$^2$) | 360 | 340 | 370 | Not measurable | 395 | 418 |
| Haze (%) | 0.4 | 0.6 | 0.8 | Not measurable | 0.9 | 0.7 |

Referring to Tables 8 and 9, it is recognized that the drawn films prepared in Examples have very excellent flexibility because they show high elongation and low modulus in company with relatively high tensile strength. On the contrary, it is recognized that the drawn film of Comparative Examples show poor flexibility because of low elongation and high modulus.

Experimental Example 5

Preparation of Blown Film and Measurement on the Film Properties

The lactide copolymer of Example 1 and 4032D of Experimental Example 1 were made into blown films according to the following conditions:
extrude motor screw 3 rpm, 14.3 ampere;
airing motor speed 793 rpm;
1$^{st}$ pinch roll motor 346 rpm;
2$^{nd}$ pinch roll motor 3 rpm;
winder 1 motor 3 rpm;
winder 2 motor 3 rpm;
temperature of extruder classified by zones: processed with the condition of 80° C., 130° C., 140° C., 150° C., 160° C., 170° C., 170° C., 170° C.;
Blown up ratio: 1:1 to 2.5:1

To the blown films, tensile strength, elongation, and modulus were measured according to the same method as in Experimental Example 4, and the results are listed in Table 10.

TABLE 10

| | Example 1 | 4032D |
|---|---|---|
| Tensile Strength (kg/cm$^2$) | 355 | Impossible to make a blown film |
| Elongation (%) | 40 | |
| Modulus (kg/mm$^2$) | 210 | |

Referring to Table 10, it is recognized that the blown films prepared in Examples have very excellent flexibility because they show high elongation and low modulus in company with relatively high tensile strength. On the contrary, in the case of prior polylactide resin such as 4032D, it is recognized that the blown processing itself was impossible.

The invention claimed is:

1. A packaging film, including a lactide copolymer including two or more block copolymerized repeating units of Chemical Formula 1 in which hard segments of polylactide repeating units are connected to both ends of soft segments of polyether polyol repeating unit, wherein the block copolymerized repeating units are connected to each other through the intermediation of urethane connecting groups derived from polyvalent isocyanate compound of which the average equivalent of isocyanate group per a molecule is 2.2 to 2.8, wherein the polyvalent isocyanate compound includes a diisocyanate compound and a polyvalent isocyanate compound of which the equivalent of isocyanate group is 3 or more, and wherein the lactide copolymer has a tensile strength of 348 to 458 kg/cm$^2$, an elongation of 40 to 60%, and an E-modulus of 1.63 to 1.79 GPa:

[Chemical Formula 1]

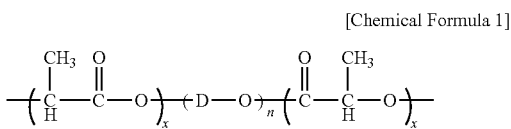

wherein in Chemical Formula 1, D is a $C_2$-$C_{10}$ linear or branched alkylene group, x is independently an integer of 30 to 500, and n is an integer of 30 to 1,000.

2. The packaging film according to claim 1, wherein a lactide copolymer has the weight average molecular weight of 100,000 to 1,000,000.

3. The packaging film according to claim 1, wherein each of the block copolymerized repeating units has a weight average molecular weight of 50,000 to 200,000.

4. The packaging film according to claim 1, wherein the polyether polyol repeating unit is selected from the group consisting of polyethyleneglycol (PEG) repeating unit, poly(1,2-propyleneglycol) repeating unit, poly(1,3-propanediol) repeating unit, polytetramethyleneglycol repeating unit, and polybutyleneglycol repeating unit.

5. The packaging film according to claim 1, wherein the polyether polyol repeating unit has a number average molecular weight of 1,000 to 15,000.

6. The packaging film according to claim 1, wherein the diisocyanate compound is selected from the group consisting of ethylene diisocyanate, 1,4-tetramethylene diisocyanate, 1,6-hexamethylene diisocyanate (HDI), 1,2-dodecane diisocyanate, cyclohexane-1,3-diisocyanate, cyclohexane-1,4-diisocyanate, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4-diphenylmethane diisocyanate, perhydro-4,4'-diphenylmethane diisocyanate, 1,3-phenylene diisocyanate, 1,4-phenylene diisocyanate, 1,4-stilbene diisocyanate, 3,3'-dimethyl-4,4'-diphenylene diisocyanate, toluene 2,4-diisocyanate (TDI), toluene 2,6-diisocyanate, diphenylmethane-2,4'-diisocyanate (MDI), diphenylmethane-2,2'-diisocyanate, diphenylmethane-4,4'-diisocyanate, and naphthalene-1,5-diisocyanate, and the polyvalent isocyanate compound of which the equivalent of isocyanate group is 3 or more is selected from the group consisting of an oligomer of above diisocyanate compounds, a polymer of above diisocyanate compounds, a ring type multimer of above diisocyanate compounds, hexamethylene diisocyanate isocyanurate, a triisocyanate compound, and an isomer thereof.

7. The packaging film according to claim 1, wherein the urethane connecting group includes a urethane bond formed by the reaction of terminal hydroxyl groups derived from the polylactide repeating unit and the isocyanate groups derived from the polyvalent isocyanate compound.

8. The packaging film according to claim 1, wherein the two or more block copolymerized repeating units include 50 to 95 weight % of the hard segments and 5 to 50 weight % of the soft segments per the total weight of the same.

9. The packaging film according to claim 1, wherein the packaging film has a tensile strength of 200 to 800 kg/cm$^2$, an elongation of 10 to 150%, and a modulus of 100 to 450 kg/mm$^2$, in machine direction (MD) and transverse direction (TD).

10. The packaging film according to claim 1, wherein the packaging film has a haze of 0 to 20%.

11. The packaging film according to claim 1, wherein the packaging film is a drawn film having a thickness of 10 to 200 μm.

12. The packaging film according to claim 1, wherein the packaging film is a blown film having a thickness of 10 to 200 μm.

* * * * *